(12) United States Patent
Zhu et al.

(10) Patent No.: US 11,782,157 B2
(45) Date of Patent: Oct. 10, 2023

(54) RANGE ESTIMATION FOR LIDAR SYSTEMS

(71) Applicant: GUANGZHOU WOYA LAIDELING TECHNOLOGY CO., LTD., Guangzhou (CN)

(72) Inventors: Zhenghan Zhu, Mountain View, CA (US); Yue Lu, Mountain View, CA (US); Yu-Ching Yeh, Mountain View, CA (US); Lingkai Kong, Mountain View, CA (US)

(73) Assignee: GUANGZHOU WOYA LAIDELING TECHNOLOGY CO., LTD., Guangzhou (CN)

( * ) Notice: Subject to any disclaimer, the term of this patent is extended or adjusted under 35 U.S.C. 154(b) by 397 days.

(21) Appl. No.: 17/000,255

(22) Filed: Aug. 21, 2020

(65) Prior Publication Data
US 2022/0057511 A1 Feb. 24, 2022

(51) Int. Cl.
*G01S 17/18* (2020.01)
*G01S 7/483* (2006.01)
*G01S 7/48* (2006.01)

(52) U.S. Cl.
CPC .............. *G01S 17/18* (2020.01); *G01S 7/483* (2013.01); *G01S 7/4804* (2013.01)

(58) Field of Classification Search
CPC ...... G01S 17/18; G01S 17/4804; G01S 7/483; G01S 7/484; G01S 7/4865; G01S 17/89; G01S 17/931; G01S 7/4873
(Continued)

(56) References Cited

U.S. PATENT DOCUMENTS

| 11,002,598 B2 * | 5/2021 | Ta | G01S 7/4865 |
| 2003/0048430 A1 * | 3/2003 | Morcom | G01S 17/32 |
| | | | 356/5.01 |

(Continued)

FOREIGN PATENT DOCUMENTS

| KR | 20190020558 A | 3/2019 |
| KR | 20200056201 A | 5/2020 |

OTHER PUBLICATIONS

International Search Report issued in corresponding International Application No. PCT/CN2021/043566, dated Nov. 5, 2021, 4 pages.
(Continued)

*Primary Examiner* — Daniel L Murphy
(74) *Attorney, Agent, or Firm* — BAYES PLLC

(57) ABSTRACT

Embodiments of the disclosure provide an optical sensing system, a range estimation system for the optical sensing system, and a method for the optical sensing system. The exemplary optical sensing system includes a transmitter configured to emit a laser pulse towards an object. The optical sensing system further includes a range estimation system configured to estimate a range between the object and the optical sensing system. The range estimation system includes an analog to digital converter (ADC) configured to generate a plurality of pulse samples based on the laser pulse returned from the object. The returned laser pulse has a substantially triangular waveform including a rising edge and a falling edge. The range estimation system further includes a processor. The processor is configured to generate synthesized pulse samples on the substantially triangular waveform based on the pulse samples. The processor is further configured to determine an arrival time of the returned laser pulse based on the ADC generated pulse samples and the synthesized pulse samples. The processor is also configured to estimate a range between the object and
(Continued)

the optical sensing system based on the arrival time of the returned laser pulse.

20 Claims, 6 Drawing Sheets

(58) Field of Classification Search
USPC .......................................................... 356/5.03
See application file for complete search history.

(56) References Cited

U.S. PATENT DOCUMENTS

| | | |
|---|---|---|
| 2013/0258312 A1 | 10/2013 | Lewis |
| 2018/0306926 A1 | 10/2018 | LaChapelle et al. |
| 2020/0088844 A1 | 3/2020 | Gao et al. |

OTHER PUBLICATIONS

Written Opinion of the International Searching Authority issued in corresponding International Application No. PCT/CN2021/043566, dated Nov. 5, 2021, 4 pages.

* cited by examiner

600

```
┌─────────────────────────────────────────────────────────┐
│ Generate a plurality of pulse samples, by a ADC, based  │  S602
│ on a laser pulse returned from an object                │
└─────────────────────────────────────────────────────────┘
                            │
                            ▼
┌─────────────────────────────────────────────────────────┐
│ Generate synthesized pulse samples, by a processor,     │  S604
│ based on the pulse samples                              │
└─────────────────────────────────────────────────────────┘
                            │
                            ▼
┌─────────────────────────────────────────────────────────┐
│ Determine a threshold based on the highest intensity    │  S606
│ value in the pulse samples                              │
└─────────────────────────────────────────────────────────┘
                            │
                            ▼
┌─────────────────────────────────────────────────────────┐
│ Determine reference pulse samples based on the threshold│  S608
└─────────────────────────────────────────────────────────┘
                            │
                            ▼
┌─────────────────────────────────────────────────────────┐
│ Determine time points when the intensity value of the   │  S610
│ returned laser pulse equals the threshold intensity value│
└─────────────────────────────────────────────────────────┘
                            │
                            ▼
┌─────────────────────────────────────────────────────────┐
│ Determine a time point when the intensity value of the  │  S612
│ returned laser pulse reaches a peak                     │
└─────────────────────────────────────────────────────────┘
                            │
                            ▼
┌─────────────────────────────────────────────────────────┐
│ Estimate a range between the object and the optical     │  S614
│ sensing system based on the determined time point       │
└─────────────────────────────────────────────────────────┘
```

FIG. 6

RANGE ESTIMATION FOR LIDAR SYSTEMS

TECHNICAL FIELD

The present disclosure relates to range estimation for a light detection and ranging (LiDAR) system, and more particularly to, range estimation using a triangular laser pulse for the LiDAR system.

BACKGROUND

Optical sensing systems such as LiDAR systems have been widely used in advanced navigation technologies, such as to aid autonomous driving or to generate high-definition maps. For example, a typical LiDAR system measures the distance to a target by illuminating the target with pulsed laser light beams and measuring the reflected pulses with a sensor such as a detector or a detector array. Differences in laser light return times, wavelengths, and/or phases can then be used to construct digital three-dimensional (3D) representations of the target. Because using a narrow laser beam as the incident light can map physical features with very high resolution, a LiDAR system is particularly suitable for applications such as sensing in autonomous driving and high-definition map surveys.

A LiDAR system typically includes a transmitter to transmit a laser pulse to an object. The laser pulse is backscattered and returned by the object, and the returned laser pulse is received by a LiDAR receiver. The LiDAR receiver typically includes a detector to convert the returned laser pulse into an electrical signal. The analog electrical signal is then converted into a digital signal by an ADC. The distance to the object (also referred to as the "range") can be estimated based on a time difference between the emitting time of the laser pulse and an arrival time of the returned laser pulse determined using the digital signal.

Range estimation relies on accurate determination of the arrival time of the returned laser pulse. Arrival time typically refers to the time when the peak of the laser pulse arrives at the receiver. If an ADC with a low sampling rate is used to sample the returned pulse, the waveform of the pulse cannot be sufficiently reconstructed from the digital signal and the arrival time of its peak cannot be accurately determined, thus impairing the range estimation accuracy. Some existing range estimation methods use a high-speed ADC to sample the returned laser pulse at a high frequency to improve the waveform reconstruction. However, the high-speed ADC is much more expensive than the ADC with a low sampling rate. Further, the high-speed ADC may cause a lot of noises during operation of the optical sensing system.

Embodiments of the disclosure improve range estimation accuracy of optical sensing systems such as LiDAR systems by using a triangular laser pulse that can be accurately reconstructed at a lower ADC sampling rate.

SUMMARY

Embodiments of the disclosure provide a range estimation system for an optical sensing system. The exemplary system includes an analog to digital converter (ADC) configured to generate a plurality of pulse samples based on a laser pulse returned from an object. The returned laser pulse has a substantially triangular waveform including a rising edge and a falling edge. The system further includes a processor. The processor is configured to generate synthesized pulse samples on the substantially triangular waveform based on the pulse samples. The processor is further configured to determine an arrival time of the returned laser pulse based on the ADC generated pulse samples and the synthesized pulse samples. The processor is also configured to estimate a range between the object and the optical sensing system based on the arrival time of the returned laser pulse.

Embodiments of the disclosure also provide a range estimation method for an optical sensing system. The exemplary method includes generating a plurality of pulse samples, by an analog to digital converter (ADC), based on a laser pulse returned from an object. The returned laser pulse has a substantially triangular waveform including a rising edge and a falling edge. The method further includes generating synthesized pulse samples, by a processor, on the substantially triangular waveform based on the pulse samples. The method also includes determining an arrival time of the returned laser pulse, by the processor, based on the ADC generated pulse samples and the synthesized pulse samples. The method additionally includes estimating a range between the object and the optical sensing system, by the processor, based on the arrival time of the returned laser pulse.

Embodiments of the disclosure further provide an optical sensing system. The exemplary optical sensing system includes a transmitter configured to emit a laser pulse towards an object. The optical sensing system further includes a range estimation system configured to estimate a range between the object and the optical sensing system. The range estimation system includes an analog to digital converter (ADC) configured to generate a plurality of pulse samples based on the laser pulse returned from the object. The returned laser pulse has a substantially triangular waveform including a rising edge and a falling edge. The range estimation system further includes a processor. The processor is configured to generate synthesized pulse samples on the substantially triangular waveform based on the pulse samples. The processor is further configured to determine an arrival time of the returned laser pulse based on the ADC generated pulse samples and the synthesized pulse samples. The processor is also configured to estimate a range between the object and the optical sensing system based on the arrival time of the returned laser pulse.

It is to be understood that both the foregoing general description and the following detailed description are exemplary and explanatory only and are not restrictive of the invention, as claimed.

BRIEF DESCRIPTION OF THE DRAWINGS

FIG. 6 is a flow chart of an exemplary method for estimating a range for a LiDAR system, according to embodiments of the disclosure.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Embodiments of the present disclosure provide systems and methods for automatically estimating a range between an object and an optical sensing system (e.g., a LiDAR system). For example, the optical sensing system may include a transmitter configured to emit a pulsed light beam (e.g., a laser pulse) towards the object. The waveform of the pulsed light beam is predetermined by a laser driver circuit (e.g., a FET-controlled driver circuit) in the transmitter of the optical sensing system. In some embodiments, the pulsed optical light beam has a substantially triangular waveform. For example, the pulse may include a linear rising edge, a linear falling edge, and a peak.

The optical sensing system may include a receiver to receive the laser pulse returned by the object. In some embodiments, the receiver may include an ADC to generate a plurality of pulse samples based on the received laser pulse. For example, the ADC may convert the returned laser pulse into 5 pulse samples when a width of the returned laser pulse is 10 ns and the ADC samples the pulse every 2 ns. In some embodiments, the optical sensing system may include a processor configured to implement an interpolation method to create synthetized samples based on the ADC generated samples. In some embodiments, the synthetized samples and the ADC generated samples may be used to determine an arrival time of the returned laser pulse (e.g., the arrival time of a pulse peak). For example, the processor may determine the arrival time of the pulse peak based on the ADC generated samples and/or the synthetized samples. The processor then may determine a distance between the object and the optical sensing system based on the arrival time of the returned laser pulse.

By automatically estimating the range between the object and the optical sensing system using the laser pulse with a triangular waveform, embodiments of the present disclosure therefore not only improve the performance of the optical sensing system but also reduce the system manufacturing cost. For example, a system may use a low-cost ADC (e.g., a low sampling rate ADC) to obtain a high time quantization accuracy. Further, because the low sampling rate ADC generates less sampling data comparing with a high sampling rate ADC, the disclosed range estimation systems and methods can save computational power (e.g., speeding up the LiDAR system processing speed). The improved optical sensing system can be used in many applications. For example, the improved optical sensing system can be used in advanced navigation technologies, such as to aid autonomous driving or to generate high-definition maps, in which the optical sensing system can be equipped on a vehicle.

Figure 1:
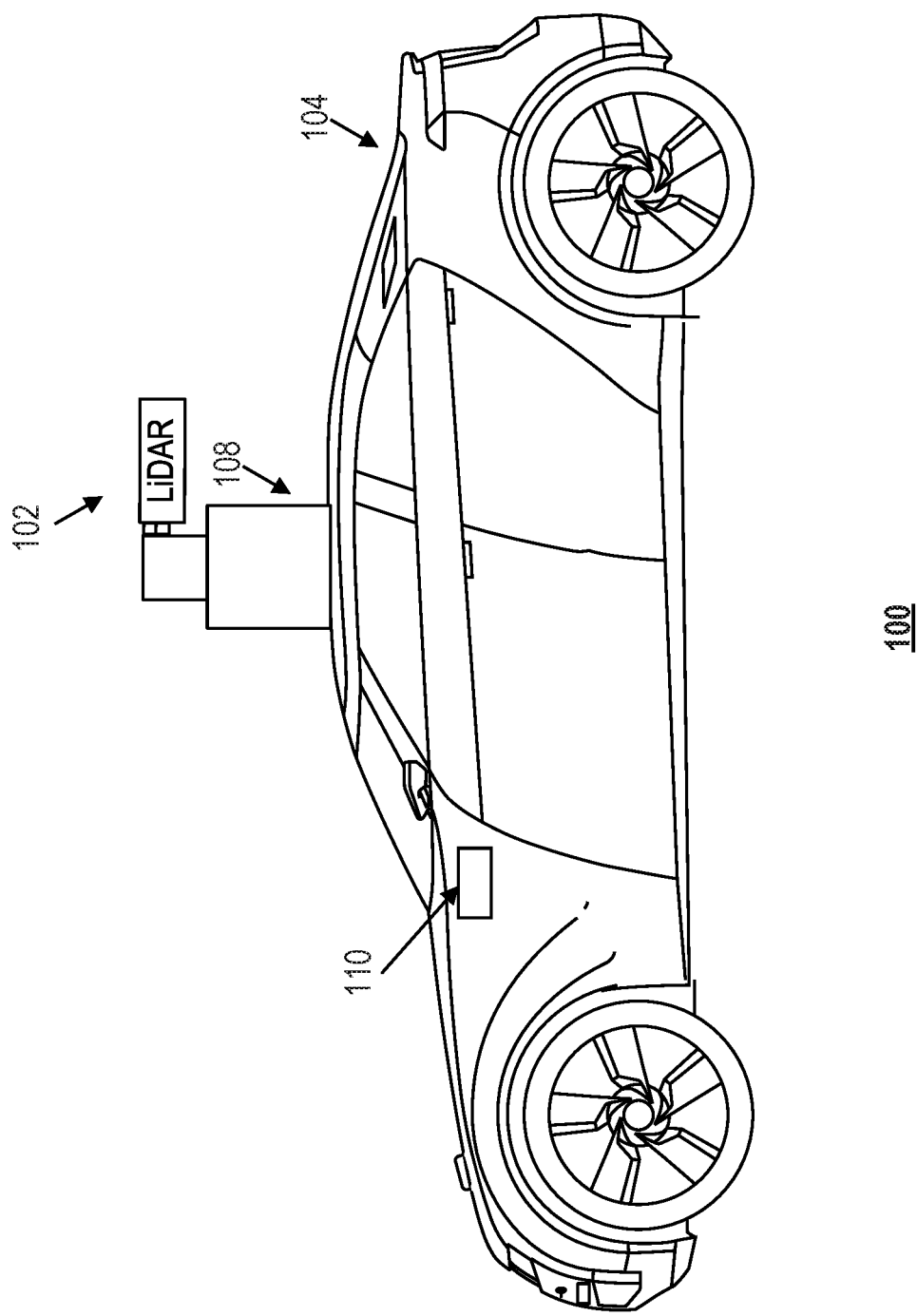
FIG. 1 illustrates a schematic diagram of an exemplary vehicle equipped with a LiDAR system, according to embodiments of the disclosure.

For example, FIG. 1 illustrates a schematic diagram of an exemplary vehicle 100 equipped with an optical sensing system (e.g., a LiDAR system) 102 (hereinafter also referred to as LiDAR system 102), according to embodiments of the disclosure. Consistent with some embodiments, vehicle 100 may be a survey vehicle configured for acquiring data for constructing a high-definition map or 3-D buildings and city modeling. Vehicle 100 may also be an autonomous driving vehicle.

As illustrated in FIG. 1, vehicle 100 may be equipped with LiDAR system 102 mounted to a body 104 via a mounting structure 108. Mounting structure 108 may be an electro-mechanical device installed or otherwise attached to body 104 of vehicle 100. In some embodiments of the present disclosure, mounting structure 108 may use screws, adhesives, or another mounting mechanism. Vehicle 100 may be additionally equipped with a sensor 110 inside or outside body 104 using any suitable mounting mechanisms. Sensor 110 may include sensors used in a navigation unit, such as a Global Positioning System (GPS) receiver and one or more Inertial Measurement Unit (IMU) sensors. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3D sensing performance.

Consistent with some embodiments, LiDAR system 102 and sensor 110 may be configured to capture data as vehicle 100 moves along a trajectory. For example, a transmitter of LiDAR system 102 may be configured to scan the surrounding environment. LiDAR system 102 measures distance to a target by illuminating the target with a pulsed laser beam and measuring the reflected/scattered pulses with a receiver. The laser beam used for LiDAR system 102 may be ultraviolet, visible, or near infrared. In some embodiments of the present disclosure, LiDAR system 102 may capture point clouds including depth information of the objects in the surrounding environment. As vehicle 100 moves along the trajectory, LiDAR system 102 may continuously capture data. Each set of scene data captured at a certain time range is known as a data frame.

Figure 2:
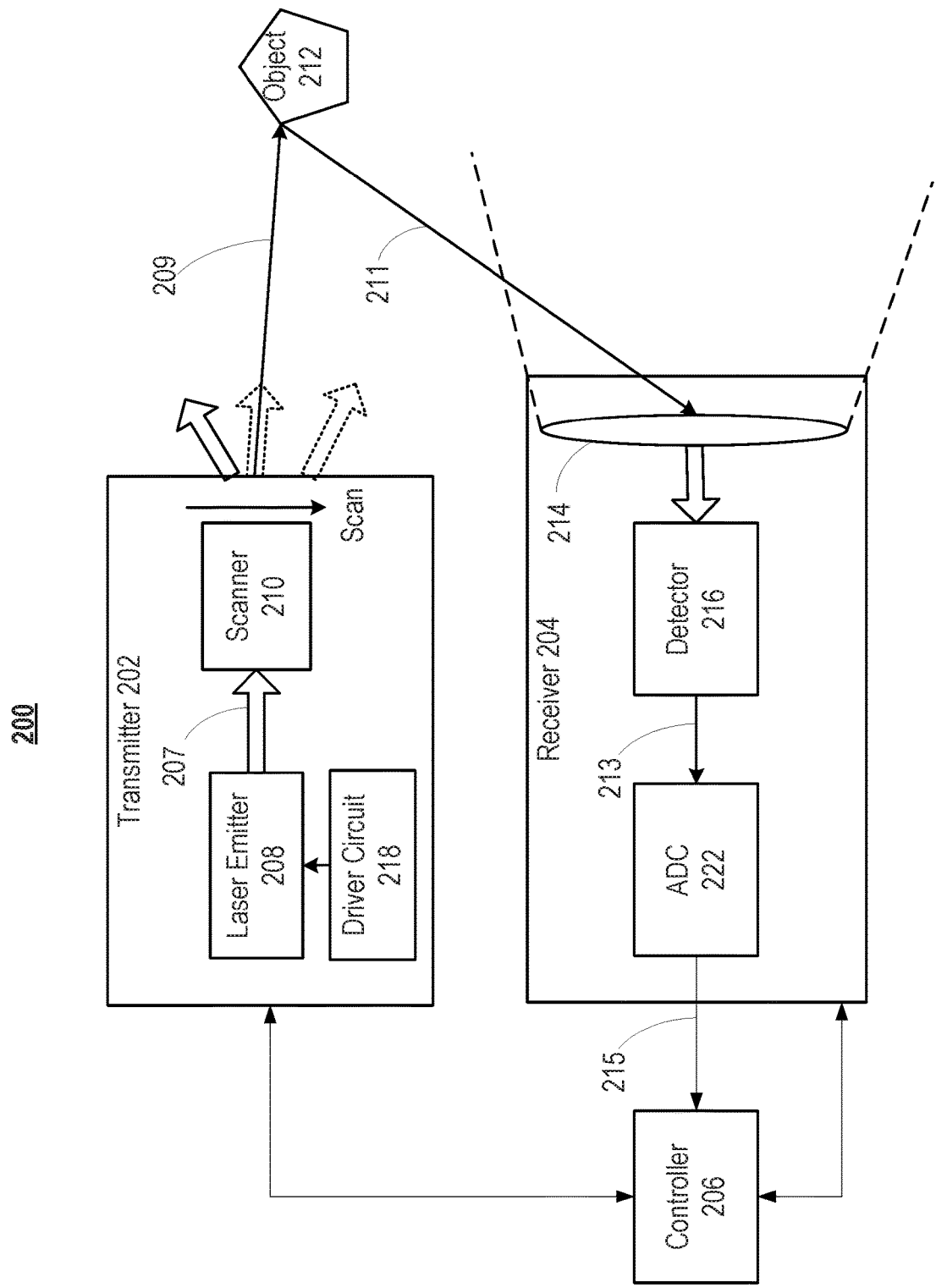
FIG. 2 illustrates a block diagram of an exemplary LiDAR system, according to embodiments of the disclosure.

FIG. 2 illustrates a block diagram of an exemplary LiDAR system 102, according to embodiments of the disclosure. LiDAR system 102 may include a transmitter 202, a receiver 204, and a controller 206. Transmitter 202 may emit optical beams (e.g., pulsed laser beams) along multiple directions. Transmitter 202 may include one or more laser sources (including a laser emitter 208 and a driver circuit 218) and a scanner 210. Transmitter 202 can sequentially emit a stream of pulsed laser beams in different directions within a scan FOV (e.g., a range in angular degrees), as illustrated in FIG. 2.

Laser emitter 208 may be configured to provide a laser beam 207 (also referred to as "native laser beam") to scanner 210. In some embodiments of the present disclosure, laser emitter 208 may generate a pulsed laser beam in the ultraviolet, visible, or near infrared wavelength range. In some embodiments of the present disclosure, laser emitter 208 may include a pulsed laser diode (PLD), a vertical-cavity surface-emitting laser (VCSEL), a fiber laser, etc. For example, a PLD may be a semiconductor device similar to a light-emitting diode (LED) in which the laser beam is created at the diode's junction. In some embodiments of the present disclosure, a PLD includes a PIN diode in which the active region is in the intrinsic (I) region, and the carriers (electrons and holes) are pumped into the active region from the N and P regions, respectively. Depending on the semiconductor materials, the wavelength of incident laser beam 207 provided by a PLD may be smaller than 1,100 nm, such as 405 nm, between 445 nm and 465 nm, between 510 nm and 525 nm, 532 nm, 635 nm, between 650 nm and 660 nm, 670 nm, 760 nm, 785 nm, 808 nm, 848 nm, or 905 nm. It is understood that any suitable laser emitter may be used as laser emitter 208 for emitting laser beam 207.

Driver circuit 218 may provide power to laser emitter 208 to turn it on, thus driving the laser emitter. Consistent with embodiments of the present disclosure, laser beam 207 emitted by laser emitter 208 may be pulsed and driver circuit 218 may be controlled to adjust the waveform of laser beam 207. For example, the driver current of driver circuit 218 may be varied in order for laser emitter 208 to emit laser pulses of a particular waveform. In some embodiments, driver circuit 218 drives laser emitter 208 to emit substantially triangular laser pulses. Driver circuit 218 may be implemented using any suitable circuit topologies that could achieve the desired waveforms. For example, in some embodiments, driver circuit 218 may be a FET-controlled driver circuit.

Scanner 210 may be configured to emit a laser beam 209 to an object 212 in a range of detection angles (collectively forming the FOV of transmitter 202). In some embodiments, scanner 210 may also include optical components (e.g., lenses, mirrors) that can collimate pulsed laser light into a narrow laser beam to increase the scan resolution and the range to scan object 212. In some embodiments, object 212 may be made of a wide range of materials including, for example, non-metallic objects, rocks, rain, chemical compounds, aerosols, clouds and even single molecules. The wavelength of laser beam 209 may vary based on the composition of object 212. In some embodiments, at each time point during the scan, scanner 210 may emit laser beam 209 to object 212 in a direction within a range of scanning angles by rotating a deflector, such as a micromachined mirror assembly.

In some embodiments, receiver 204 may be configured to detect a returned laser beam 211 returned from object 212. The returned laser beam 211 may be in a different direction from laser beam 209. Receiver 204 can collect laser beams returned from object 212 and output electrical signals reflecting the intensity of the returned laser beams. Upon contact, laser light can be reflected/scattered by object 212 via backscattering, such as Rayleigh scattering, Mie scattering, Raman scattering, and fluorescence. As illustrated in FIG. 2, receiver 204 may include a lens 214, a detector 216, and an ADC 222. Lens 214 may be configured to collect light from a respective direction in the receiver field of view (FOV) and converge the light beam to focus on detector 216. At each time point during the scan, returned laser beam 211 may be collected by lens 214. Returned laser beam 211 may be returned from object 212 and have the same wavelength as laser beam 209.

Detector 216 may be configured to detect returned laser beam 211 returned from object 212 and converged by lens 214. In some embodiments, detector 216 may convert the laser light (e.g., returned laser beam 211) converged by lens 214 into an electrical signal 213 (e.g., a current or a voltage signal). Electrical signal 213 may be an analog signal which is generated when photons are absorbed in a photodiode included in detector 216. In some embodiments, detector 216 may include a PIN detector, an avalanche photodiode (APD) detector, a single photon avalanche diode (SPAD) detector, a silicon photo multiplier (SiPM) detector, or the like.

ADC 222 may be configured to digitize electrical signal 213 generated by detector 216. For example, ADC 222 may convert electrical signal 213 into a digital signal 215 (e.g., digital values representing the intensity of electrical signal 213 at each sampling time point). Digital signal 215 may be transmitted to controller 206 to be processed and analyzed.

For example, controller 206 in LiDAR system 102 may include a processor to determine the distance of object 212 from LiDAR system 102 based on digital signal 215 and data of laser beam 209. In particular, the distance can be determined based on the travel time measured between the departure time of a laser pulse when it is transmitted by transmitter 202 and the arrival time of the returned laser pulse when it is received by receiver 204. In some alternative embodiments, digital signal 215 may be transmitted to and processed by a separate signal processor at a different location but communicating with controller 206 through a network (not shown). For example, the separate signal processor may be in a cloud or may be alternatively in a single location (such as inside a mobile device) or distributed locations.

Controller 206 may be configured to control transmitter 202 and/or receiver 204 to perform detection/sensing operations. In some embodiments consistent with the present disclosures, controller 206 may be configured to receive digital signal 215 to estimate the range based on an arrival time of the returned laser beam 211 and data of laser beam 209 (e.g., a departure time and a waveform information). For example, controller 206 may generate synthesized data based on digital signal 215 using an interpolation method. These synthesized data may reduce quantization errors introduced by ADC 222 during the analog-to-digital conversion of the returned laser beam 211. In some embodiments, controller 206 may determine the arrival time of returned laser beam 211 based on digital signal 215 and/or the synthesized data. For example, controller 206 may use digital signal 215 and the pulse waveform information of laser beam 209 to determine the arrival time of the returned laser beam 211. In some embodiments, controller 206 may determine the distance of object 212 from LiDAR system 102 based on the arrival time of the returned laser beam 211 and the departure time of laser beam 209.

In some embodiments, controller 206 may control driver circuit 218 to drive laser emitter 208 to emit laser beam 207. For example, controller 206 may supply a voltage command signal to driver circuit 218 so that the driver circuit supplies a varying driver current to laser emitter 208 in response to the voltage command signal provided by controller 206. In some embodiments, laser beam 207 may be a laser pulse having a substantially triangular waveform. In some embodiments, controller 206 may control scanner 210 to emit laser beam 209 and record the departure time of laser beam 209. The departure time may be stored in controller 206 for determining a traveling time of the laser pulse.

Figure 3:
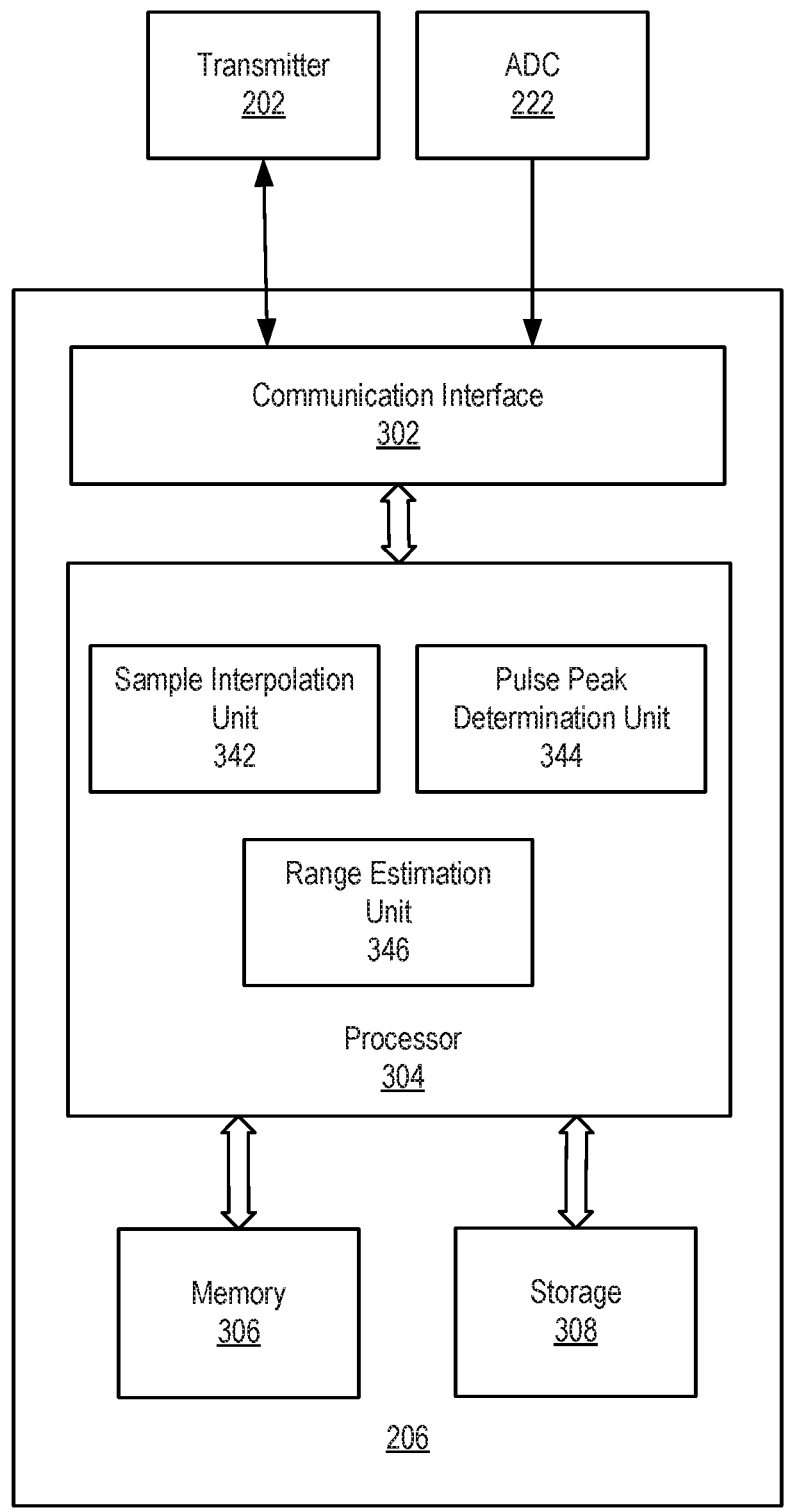
FIG. 3 illustrates a schematic diagram of an exemplary controller for estimating a range for a LiDAR system, according to embodiments of the disclosure.

For example, FIG. 3 illustrates a schematic diagram of an exemplary controller 206 for estimating a range for a LiDAR system, according to embodiments of the disclosure. As shown by FIG. 3, controller 206 may include a communication interface 302, a processor 304, a memory 306, and a storage 308. In some embodiments, controller 206 may have different modules in a single device, such as an integrated circuit (IC) chip (e.g., implemented as an application-specific integrated circuit (ASIC) or a field-programmable gate array (FPGA)), or separate devices with dedicated functions. In some embodiments, one or more components of controller 206 may be located in a cloud or may be alternatively in a single location (such as inside a mobile device) or distributed locations. Components of controller 206 may be in an integrated device or distributed at different locations but communicate with each other through a network (not shown). Consistent with the present disclosure, controller 206 may be configured to generate synthesized pulse data based on the ADC sampled pulse data, determine the arrival time of the returned laser pulse using the synthesized and sampled pulse data, and estimate the range between the object and the LiDAR system based on the arrival time. In some embodiments, controller 206 may also perform various other control functions of other components of LiDAR system 102.

Communication interface 302 may send signals to and receive signals from components of transmitter 202 (such as scanner 210) and receiver 204 (such as ADC 222) via communication cables, a Wireless Local Area Network (WLAN), a Wide Area Network (WAN), wireless networks such as radio waves, a cellular network, and/or a local or short-range wireless network (e.g., Bluetooth™), or other communication methods. In some embodiments, communication interface 302 may include an integrated service digital network (ISDN) card, cable modem, satellite modem, or a modem to provide a data communication connection. As another example, communication interface 302 may include a local area network (LAN) card to provide a data communication connection to a compatible LAN. Wireless links can also be implemented by communication interface 302. In such an implementation, communication interface 302 can send and receive electrical, electromagnetic or optical signals in analog form or in digital form.

Consistent with some embodiments, communication interface 302 may receive digital signal 215 reflecting the intensity of the returned laser pulse at each sampling time point from ADC 222. Communication interface 302 may provide control signals to driver circuit 218 to control the driver current to laser emitter 208. Communication interface 302 may also receive acquired signals from and provide control signals to various other components of LiDAR system 102.

Figure 4A:
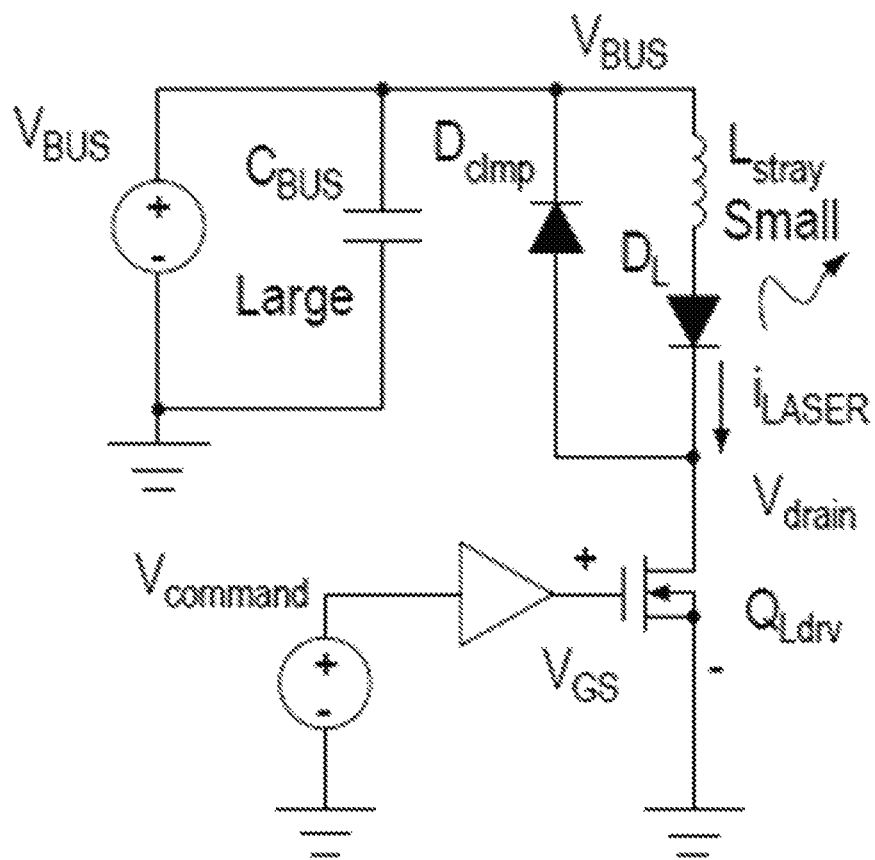
FIG. 4A illustrates an exemplary emitter driver circuit for generating a laser pulse used for range estimation, according to embodiments of the disclosure.
Figure 4B:
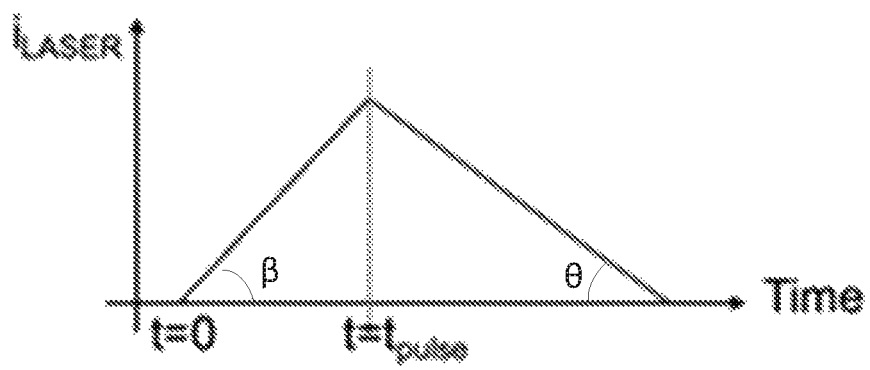
FIG. 4B illustrates an exemplary waveform of a laser pulse generated by the emitter driver circuit in FIG. 4A, according to embodiments of the disclosure.

FIG. 4A illustrates an exemplary emitter driver circuit for generating a laser pulse used for range estimation, according to embodiments of the disclosure. FIG. 4B illustrates an exemplary waveform of a laser pulse generated by the emitter driver circuit in FIG. 4A, according to embodiments of the disclosure. In some embodiments, driver circuit 218 uses a semiconductor switch (e.g., gallium nitride (GaN) power FETs) that has a gate response (e.g., a driver current $i_{LASER}$) to the voltage command signal $V_{command}$ applied by controller 206. The driver circuit may be connected in series with laser emitter 208 to supply the driver current $i_{LASER}$ to flow through the laser diodes, causing laser beams to be emitted.

FIG. 4A shows a FET-controlled driver circuit, as an example of driver circuit 218. In some embodiments, the FET-controlled driver circuit uses a large $C_{BUS}$ so that $V_{BUS}$ is almost constant. As shown in FIG. 4A, when switch $Q_{Ldrv}$ is on, driver current $i_{LASER}$ can be expressed using Equation (1):

$$i_{LASER}(t) = \frac{(V_{BUS} - V_{DL})}{L_{stray}} \cdot t, \quad (1)$$

where $V_{DL}$ is an operation voltage of laser diode and $t \geq 0$. Because $C_{BUS}$ is large, driver current $i_{LASER}$ may be regarded as a linear function of time t. As a result, a rising slope angle β as shown in FIG. 4B can be determined based on the coefficient $$\frac{(V_{BUS} - V_{DL})}{L_{stray}}$$

in Equation (1).

As shown in FIG. 4A, at time point $t=t_{pulse}$, switch $Q_{Ldrv}$ is off and laser peak current $$i_{LASER}(t_{pulse}) = \frac{(V_{BUS} - V_{DL})}{L_{stray}} \cdot t_{pulse}$$

The voltage across $L_{stray}$ becomes $-(V_{DCLMP}+V_{DL})$ after time point $t_{pulse}$. As a result, driver current $i_{LASER}$ may be expressed using Equation (2):

$$i_{LASER}(t) = \frac{(V_{BUS} - V_{DL})}{L_{stray}} \cdot t_{pulse} - \frac{(V_{DCLMP} + V_{DL})}{L_{stray}} \cdot (t - t_{pulse}), \quad (2)$$

where $t > t_{pulse}$.

A falling slope angle θ in the waveform as shown in FIG. 4B can be determined based on the constant $$\frac{(V_{BUS} - V_{DL})}{L_{stray}} \cdot t_{pulse}$$

and the coefficient $$\frac{(V_{DCLMP} + V_{DL})}{L_{stray}}$$

in Equation (2). It is contemplated that the emitted laser pulse (e.g., laser beam 209) and the returned lase pulse (e.g., returned laser beam 211) have a same waveform. Consistent with some embodiments, the angle information may be saved in controller 206 and used to determine the arrival time of the returned laser pulse.

It is contemplated that other suitable circuit topologies may be adopted by driver circuit 218 to drive laser emitter 208 to generate a desired pulse waveform. For example, the waveform may be defined by only a limited number of parameters, e.g., the triangular waveform, such that it can be reconstructed from under-sampled digital data.

Processor 304 may include any appropriate type of general-purpose or special-purpose microprocessor, digital signal processor, or microcontroller. Processor 304 may be configured as a separate processor module dedicated to LiDAR range estimation, e.g., determining the range between the object and the LiDAR system based on the arrival time of the returned laser pulse and the data of the emitted pulse (e.g., the waveform information and the departure time from scanner 210). Alternatively, processor 304 may be configured as a shared processor module for performing other functions of LiDAR controls.

Memory 306 and storage 308 may include any appropriate type of mass storage provided to store any type of information that processor 304 may need to operate. Memory 306 and storage 308 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 306 and/or storage 308 may be configured to store one or more computer programs that may be executed by processor 304 to perform functions disclosed herein. For example, memory 306 and/or storage 308 may be configured to store program(s) that may be executed by processor 304 for LiDAR range estimation. In some embodiments, memory 306 and/or storage 308 may also store intermediate data such as digital signals converted by ADC 222 from the returned laser pulse, synthetized data created based on the converted digital signals, threshold intensity values determined based on the digital signals, reference pulse samples based on the threshold intensity values, threshold time points for determining arrival times of the returned laser pulses, etc.

As shown in FIG. 3, processor 304 may include multiple modules, such as a sample interpolation unit 342, a pulse peak determination unit 344, and a range estimation unit 346, and the like. These modules can be hardware units (e.g., portions of an integrated circuit) of processor 304 designed for use with other components or software units implemented by processor 304 through executing at least part of a program. The program may be stored on a computer-readable medium, and when executed by processor 304, it may perform one or more functions. Although FIG. 3 shows units 342-346 all within one processor 304, it is contemplated that these units may be distributed among different processors located closely or remotely with each other.

In some embodiments, sample interpolation unit 342 may synthetize a plurality of pulse samples based on the ADC generated pulse samples. For example, sample interpolation unit 342 may execute a program of an interpolation method (e.g., farrow interpolation) stored in memory 306 to generate the synthetized pulse samples. It is to be understood that any suitable linear or non-linear interpolation methods may be performed by sample interpolation unit 342 to generate synthetized pulse samples based on the ADC generated pulse samples. Because the waveform of the returned laser pulse is substantially triangular, which includes a linear rising edge and a linear falling edge, additional pulse samples could be synthetized through interpolation from the pulse samples from ADC 222. The synthetized pulse samples can be used to supplement the ADC generated pulse samples to reconstruct the waveform of the returned pulse. These synthetized pulse samples therefore can help to reduce quantization errors introduced by ADC 222 during the analog-to-digital conversion of the returned laser pulse.

Figure 5:
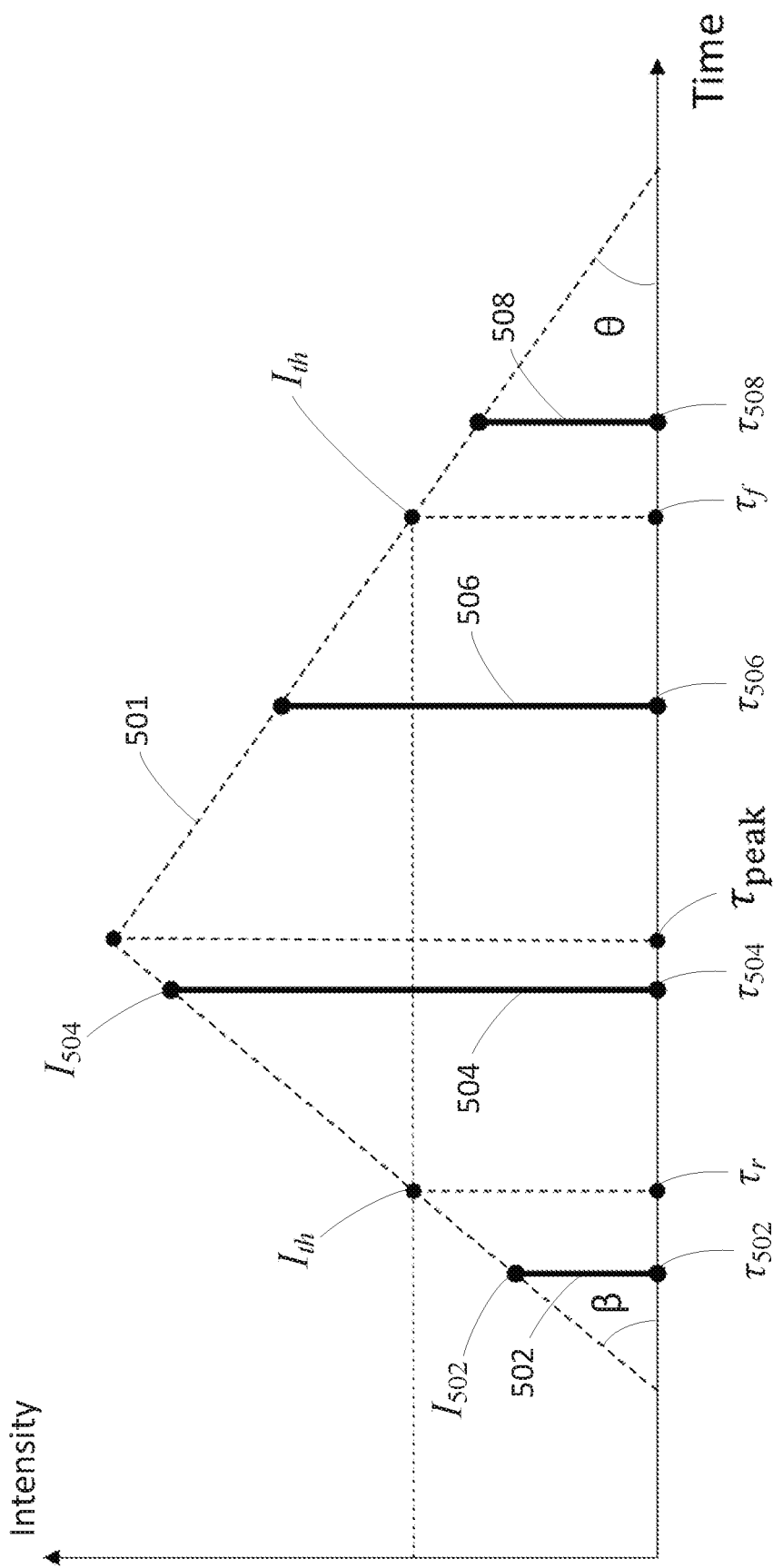
FIG. 5 illustrates exemplary pulse samples, according to embodiments of the disclosure.

Based on the ADC generated pulse samples and the synthetized pulse samples, pulse peak determination unit 344 may determine the arrival time of the peak of the returned laser pulse. For example, FIG. 5 illustrates exemplary pulse samples, according to embodiments of the disclosure. As shown in FIG. 5, four pulse samples (e.g., samples 502, 504, 506, and 508 marked with solid lines) are generated based on an electrical signal 501 (as an example of electrical signal 213 in FIG. 2). Profile of electrical signal 501 is shown in a dashed triangle in FIG. 5. As shown, electrical signal 501 has a linear rising edge and a linear falling edge, and the two edges intersect at a peak point. The pulse samples are located on the profile of electrical signal 501. In some embodiments, some or all of the four pulse samples may be generated by the ADC after sampling electrical signal 501. In some embodiments, the four pulse samples may further include synthetized pulses samples generated by sample interpolation unit 342 based on the ADC generated samples. The corresponding sampling time points for the four pulse samples are time points $\tau_{502}$, $\tau_{504}$, $\tau_{506}$, and $\tau_{508}$. In some embodiments, pulse peak determination unit 344 may determine the arrival time of the pulse peak (e.g., $\tau_{peak}$ as shown in FIG. 5) based on intensity values of samples 502, 504, 506, and 508 and the corresponding sampling time points $\tau_{502}$, $\tau_{504}$, $\tau_{506}$, and $\tau_{508}$.

In some embodiments, a threshold intensity value may be determined based on a predetermined threshold and a highest intensity value among the pulse samples. For example, as shown in FIG. 5, sample 504 has a highest intensity value $I_{504}$ among the four pulse samples. In some embodiments, the predetermined threshold may be expressed as a percentage (e.g., 50%). Accordingly, the threshold intensity value (e.g., $I_{th}$ in FIG. 5) may be calculated as a predetermined percentage of the highest intensity value among pulse samples. For example, $I_{th}$ may be calculated as 50% of intensity value $I_{504}$ in FIG. 5. In some alternative embodiments, the threshold intensity value $I_{th}$ may be determined based on an empirical value (e.g., an intensity value of a pulse peak received in other LiDAR systems). For example, if the predetermined threshold is 50% and the empirical value is 1.0, the threshold intensity value $I_{th}$ may be calculated as 50% of 1.0, that is 0.5. In some embodiments, the predetermined threshold may be greater than a noise level of electrical signal 501. For example, if a signal-to-noise ratio of electrical signal 501 is 10, the predetermined threshold may be greater than 10%.

Based on the determined threshold intensity value $I_{th}$, pulse peak determination unit 344 may determine a time point corresponding to the threshold intensity value on each of the rising edge and the falling edge of electrical signal 501. In some embodiments, each threshold time point is determined based on two reference pulse samples on a same edge of the triangular waveform. In some embodiments, a first intensity value of the first reference pulse sample may be lower than the threshold intensity value, and a second intensity value of the second reference pulse sample may be higher than the threshold intensity value. For example, as shown on the rising edge of electrical signal 501 in FIG. 5, an intensity value $I_{502}$ of sample 502 is lower than threshold intensity value $I_{th}$, and an intensity value $I_{504}$ of sample 504 is higher than threshold intensity value $I_{th}$. Samples 502 and 504 therefore may be selected as the reference pulse samples on the rising edge of electrical signal 501 to determine a threshold time point $\tau_r$ corresponding to threshold intensity value $I_{th}$ on the rising edge. Similarly, as shown in FIG. 5, samples 506 and 508 may be selected as reference pulse samples to determine threshold time point $\tau_f$ corresponding to threshold intensity value $I_{th}$ on the falling edge.

In some embodiments, the first reference pulse sample may be a latest pulse sample generated before the threshold time point in a time domain and the second reference pulse sample may be a first pulse sample generated after the threshold time point. In other words, the two reference pulse samples are two adjacent samples in time, and the threshold time point fall in between the two reference pulse samples. For example, as shown in FIG. 5, sample 502 is the latest pulse sample before $\tau_r$ and sample 504 is the first pulse sample after $\tau_r$. Samples 502 and 504 therefore are selected as the reference pulse samples to determine threshold time point $\tau_r$ on the rising edge of electrical signal 501. Similarly, because sample 506 is the latest pulse sample before $\tau_f$ and sample 508 is the first pulse sample after $\tau_f$, samples 506 and 508 are selected as the reference pulse samples to determine threshold time point $\tau_f$ on the falling edge of electrical signal 501.

In some embodiments, the threshold time point may be determined using a geometry method based on the threshold intensity value, the intensity value of the reference pulse samples, and sampling time point of the reference pulse samples. For example, threshold time point $\tau_r$ in FIG. 5 may be determined based on threshold intensity value $I_{th}$, intensity values $I_{502}$ and $I_{504}$, sampling time points $\tau_{502}$ and $\tau_{504}$. Threshold time point $\tau_f$ on the falling edge of electrical signal 501 in FIG. 5 may be determined in a similar way.

Based on the determined threshold time points $\tau_r$ and $\tau_f$, pulse peak determination unit 344 may determine the arrival time of the pulse peak. In some embodiments, the arrival time of the pulse peak may be determined based on slope information of the pulse waveform. For example, as shown in FIG. 5, electrical signal 501 has a rising slope angle $\beta$ and a falling slope angle $\theta$. The angle information may be stored in memory 306 as shown in FIG. 3. The waveform of the returned laser pulse may be the same as that of the emitted laser pulse which is determined through the circuit topology implemented by laser driver circuit 218 in transmitter 202 as shown in FIG. 2. The arrival time of electrical signal 501 (e.g., $\tau_{peak}$) can be determined based on a trigonometry of rising slope angle $\beta$, a trigonometry of falling slope angle $\theta$, and threshold time points $\tau_r$ and $\tau_f$.

Based on the arrival time of the pulse peak, range estimation unit 346 may determine the distance between the object and the LiDAR system. In some embodiments, the departure time of the emitted laser pulse (e.g., laser beam 209) and the estimated arrival time may be used to jointly determine the traveling time of the laser pulse. For example, memory 306 in FIG. 3 may store the departure time of laser beam 209. Once the arrival time of returned laser beam 211 is determined by pulse peak determination unit 344, range estimation unit 346 may determine the traveling time (e.g., Time-of-Flight) of the laser pulse. Range estimation unit 346 may further determine the distance between the object and the LiDAR system based on the traveling time of the laser pulse and the speed of light. For example, the distance can be determined based on a formula of (speed of light×Time-of-Flight)/2.

FIG. 6 is a flow chart of an exemplary method 600 for estimating a range for a LiDAR system, according to embodiments of the disclosure. In some embodiments, method 600 may be performed by various components of LiDAR system 102, e.g., transmitter 202, receiver 204, and controller 206. In some embodiments, method 600 may include steps S602-S614. It is to be appreciated that some of the steps may be optional. Further, some of the steps may be performed simultaneously, or in a different order than shown in FIG. 6.

In step S602, ADC 222 in receiver 204 may receive electrical signal 213 reflecting the intensity information of returned laser beam 211. Consistent with the present disclosures, electrical signal 213 may be converted by ADC 222 into digital signal 215 including a plurality of pulse samples. Each pulse sample may include an intensity value of the returned laser pulse at the corresponding sampling time point. Digital signal 215 may be transmitted to controller 206 for further processing.

In step S604, processor 304 in controller 206 may process digital signal 215 and generate a plurality of synthesized pulse samples. For example, processor 304 may execute an interpolation program stored in memory 306 in controller 206 and generate the synthesized pulse samples. Synthesized pulse samples may supplement the ADC generated pulse samples to effectively reduce quantization errors introduced by ADC 222 during the analog-to-digital conversion processing.

In step S606, processor 304 may determine a threshold based on the highest intensity value among the pulse samples. The threshold may be a predetermined value subject to the noise level of the received electrical signal (e.g., electrical signal 213). For example, the predetermined threshold may be a value larger than the noise level of electrical signal 213. Processor 304 may determine threshold intensity value $I_{th}$ based on the product of the predetermined threshold percentage and the highest intensity value among the pulse samples. In some alternative embodiments, threshold intensity value $I_{th}$ may be determined based on an empirical value such as an intensity peak value used in other LiDAR systems.

In step S608, processor 304 may be configured to determine reference pulse samples based on threshold intensity value $I_{th}$. Consistent with the present disclosures, the waveform of the laser pulse may include a rising edge and a falling edge. The returned laser pulse may reach threshold intensity value $I_{th}$ once on each of the rising edge and the falling edge as shown in FIG. 5. On the rising edge, processor 304 may select a first reference pulse sample having a lower intensity value than threshold intensity value $I_{th}$ and a second reference pulse sample having a higher intensity value than threshold intensity value $I_{th}$. The first reference pulse sample is generated earlier than the second reference pulse sample in time. On the falling edge, processor 304 may select a first reference pulse sample having a higher intensity value than threshold intensity value $I_{th}$ and a second reference pulse sample having a lower intensity value than threshold intensity value $I_{th}$. The first reference pulse sample is generated earlier than the second reference pulse sample in time.

In step S610, processor 304 may determine threshold time points when the intensity value of the returned laser pulse equals threshold intensity value $I_{th}$ based on the selected reference pulse samples in step S608. As shown in FIG. 5, threshold time points $\tau_r$ and $\tau_f$ may be determined on the rising edge and the falling edge, respectively. For example, threshold time points $\tau_r$ and $\tau_f$ may be calculated based on the intensity values and time points of the reference pulse samples.

In step S612, processor 304 may determine the time point (e.g., the arrival time of the returned laser pulse) when the intensity value of the returned laser pulse reaches a peak. Processor 304 may use slope information of the waveform of the laser pulse and the threshold time points determined in step S610 to determine the arrival time of the returned laser pulse. The slope information of the rising edge (e.g., rising slope angle $\beta$) may be determined according to Equation (1). The slope information of the falling edge (e.g., falling slope angle $\theta$) may be determined according to Equation (2).

In step S614, processor 304 may estimate the range between the object and the LiDAR system. Transmitter 202 may send the departure time of the emitted laser pulse to controller 206. Accordingly, processor 304 may calculate the traveling time of the laser pulse based on the departure time and the arrival time of the laser pulse. Processor 304 may further determine the distance between the object and the LiDAR system using the traveling time and the speed of light.

Although the disclosure is made using a LiDAR system as an example, the disclosed embodiments may be adapted and implemented to other types of optical sensing systems that use receivers to receive optical signals not limited to laser beams. For example, the embodiments may be readily adapted for optical imaging systems or radar detection systems that use electromagnetic waves to scan objects. Emitters and driver circuits other than those disclosed above may be used. For example, the emitter may be any other light emitter suitable for emitting the optical signals used by the respective optical sensing systems and the driver circuit may be any driver suitable to drive the respective emitter.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A range estimation system for an optical sensing system, comprising:
an analog to digital converter (ADC) configured to generate a plurality of pulse samples based on a laser pulse returned from an object, wherein a waveform of the returned laser pulse is substantially triangular including a rising edge and a falling edge; and
a processor, configured to:
generate synthesized pulse samples on the substantially triangular waveform based on the pulse samples;
determine an arrival time of the returned laser pulse based on the ADC generated pulse samples and the synthesized pulse samples; and
estimate a range between the object and the optical sensing system based on the arrival time of the returned laser pulse.

2. The range estimation system of claim 1, wherein the rising edge and the falling edge are both linear, and wherein the synthesized pulse samples are generated by interpolating the plurality of the pulse samples.

3. The range estimation system of claim 1, wherein slopes for the rising edge and the falling edge of the substantially triangular waveform are predetermined by a laser driver circuit in a transmitter of the optical sensing system.

4. The range estimation system of claim 1, wherein to determine the arrival time of the returned laser pulse, the processor is further configured to determine two reference pulse samples on each of the rising edge and the falling edge based on a threshold.

5. The range estimation system of claim 4, wherein the ADC receives an electrical signal representing the returned laser pulse, wherein the threshold is larger than a noise level of the electrical signal received by the ADC.

6. The range estimation system of claim 4, wherein the processor is further configured to determine a threshold intensity value using a highest intensity value among the pulse samples and the threshold.

7. The range estimation system of claim 6, wherein a first intensity value of one reference pulse sample is lower than the threshold intensity value and a second intensity value of the other reference pulse sample on a same edge of the substantially triangular waveform is higher than the threshold intensity value.

8. The range estimation system of claim 6, wherein to determine the arrival time of the returned laser pulse, the processor is further configured to determine time points when the intensity value of the returned laser pulse equals the threshold intensity value on the rising edge and the falling edge respectively.

9. The range estimation system of claim 8, wherein to determine the arrival time of the returned laser pulse, the processor is further configured to determine a time point when the intensity value of the returned laser pulse reaches a peak based on the determined time points when the intensity value of the returned laser pulse equals the threshold intensity value.

10. A range estimation method for an optical sensing system, comprising:
generating a plurality of pulse samples, by an analog to digital converter (ADC), based on a laser pulse returned from an object, wherein a waveform of the returned laser pulse is substantially triangular including a rising edge and a falling edge;
generating synthesized pulse samples, by a processor, on the substantially triangular waveform based on the pulse samples;
determining an arrival time of the returned laser pulse, by the processor, based on the ADC generated pulse samples and the synthesized pulse samples; and
estimating a range between the object and the optical sensing system, by the processor, based on the arrival time of the returned laser pulse.

11. The range estimation method of claim 10, wherein the rising edge and the falling edge are both linear, and wherein the synthesized pulse samples are generated by interpolating the plurality of the pulse samples.

12. The range estimation method of claim 10, wherein slopes for the rising edge and the falling edge of the substantially triangular waveform are predetermined by a laser driver circuit in a transmitter of the optical sensing system.

13. The range estimation method of claim 10, wherein determining the arrival time of the returned laser pulse further comprises:
determining two reference pulse samples on each of the rising edge and the falling edge based on a threshold.

14. The range estimation method of claim 13, wherein the ADC receives an electrical signal representing the returned laser pulse, wherein the threshold is larger than a noise level of the electrical signal received by the ADC.

15. The range estimation method of claim 13, wherein a threshold intensity value is determined using a highest intensity value among the pulse samples and the threshold.

16. The range estimation method of claim 15, wherein a first intensity value of one reference pulse sample is lower than the threshold intensity value and a second intensity value of the other reference pulse sample on a same edge of the substantially triangular waveform is higher than the threshold intensity value.

17. The range estimation method of claim 15, wherein determining the arrival time of the returned laser pulse further comprises:
determining time points when the intensity value of the returned laser pulse equals the threshold intensity value on the rising edge and the falling edge respectively.

18. The range estimation method of claim 17, wherein determining the arrival time of the returned laser pulse further comprises:
- determining a time point when the intensity value of the returned laser pulse reaches a peak based on the determined time points when the intensity value of the returned laser pulse equals the threshold intensity value.

19. An optical sensing system, comprising:
- a transmitter configured to emit a laser pulse towards an object; and
- a range estimation system configured to estimate a range between the object and the optical sensing system, the range estimation system comprising:
- an analog to digital converter (ADC) configured to generate a plurality of pulse samples based on the laser pulse returned from the object, wherein a waveform of the returned laser pulse is substantially triangular including a rising edge and a falling edge; and
- a processor, configured to:
- generate synthesized pulse samples on the substantially triangular waveform based on the pulse samples;
- determine an arrival time of the returned laser pulse based on the ADC generated pulse samples and the synthesized pulse samples; and
- estimate a range between the object and the optical sensing system based on the arrival time of the returned laser pulse.

20. The optical sensing system of claim 19, wherein the rising edge and the falling edge are both linear and slopes for the rising edge and the falling edge of the triangular waveform are predetermined by a laser driver circuit in a transmitter of the optical sensing system, and wherein the synthesized pulse samples are generated by interpolating the plurality of the pulse samples.

* * * * *